United States Patent [19]

Lane

[11] 3,921,081

[45] Nov. 18, 1975

[54] PULSE GENERATOR FOR PRODUCING PULSES OF DEFINABLE WIDTH

[75] Inventor: Lawrence Jubin Lane, Stuarts Draft, Va.

[73] Assignee: General Electric Company, Salem, Va.

[22] Filed: Oct. 30, 1974

[21] Appl. No.: 519,261

[52] U.S. Cl. .................... 328/140; 328/58; 307/265
[51] Int. Cl.[2] .......................................... H03K 1/18
[58] Field of Search ............... 307/265; 328/58, 140

[56] References Cited

UNITED STATES PATENTS

| | | | |
|---|---|---|---|
| 3,443,232 | 5/1969 | Stinson | 307/265 X |
| 3,668,423 | 6/1972 | Couch | 307/265 X |
| 3,742,257 | 6/1973 | Wittenzellner | 307/265 X |
| 3,753,155 | 8/1973 | Opal et al. | 307/265 X |
| 3,778,638 | 12/1973 | Garratt | 328/140 X |

*Primary Examiner*—John S. Heyman
*Attorney, Agent, or Firm*—Arnold E. Renner

[57] ABSTRACT

A pulse generating circuit provides a series of pulses each of which is a given percentage or portion of the period of a source signal the frequency of which may vary over a fairly substantial range. This circuit recognizes a prescribed condition of the source signal to initiate a timing period the length of which is a function of the frequency of the source signal. Pulses each having a width of the period so timed are thus generated which pulses are a given percentage of the period of the source of the signal.

7 Claims, 4 Drawing Figures

PULSE GENERATOR FOR PRODUCING PULSES OF DEFINABLE WIDTH

Background of the Invention

The present invention relates generally to pulse generators and more specifically to a pulse generator for producing a series or train of pulses with each pulse having a width which is a prescribed portion or a given percentage of the period of a source signal of varying frequency.

In certain situations it is desirable to obtain pulses of a given percentage or a given number of degrees of a source signal such as a line voltage. For example, in certain power systems the power generator is excited by a static exciter or power supply in which thyristors (commonly silicon controlled rectifiers) are selectively rendered conductive and nonconductive to control the voltage supplied to the power generator field.

There is no problem prevalent in achieving a pulse of a given number of degrees of the source period when the source signal frequency is fixed. However, in certain situations the source signal frequency is not fixed but does in fact vary; e.g. during startup of a power generator. In the example of the static exciter it is not uncommon for a four to one frequency range to occur. As such, a fixed thyristor firing pulse of say 60° at the lower frequency would result in a 240° pulse, compared to the source frequency, at the higher frequencies.

Summary of the Invention

It is, therefore, an object of the present invention to provide an improved pulse generator.

Another object is to provide a pulse generator for providing pulses of varying width.

It is a further object of the present invention to provide an improved pulse generator for providing pulses which are a given number of degrees or a given percentage of the source signal period.

It is a still further object to provide an improved pulse generator for providing pulses which are of a fixed number of degrees or a given percentage of the source signal period which permits for the ready adjustment or variation in the number of degrees or percentage.

The foregoing and other objects are achieved in accordance with the present invention by the provision of a pulse generating circuit which produces pulses each having a width corresponding to a prescribed percentage or a given number of degrees of a variable period source signal. This is achieved by recognizing a prescribed condition of the source signal to initiate the generation of a pulse. This same recognition also initiates the operation of a suitable timer having a variable time period which is a function of the frequency of the source signal. At the end of the time period thus determined a pulse termination signal is generated. Through suitable switching means responsive to the initiation signal and the termination signal there is provided an output pulse which has a width or a duration corresponding to the time period which, as was stated, is a function of the frequency of the source signal.

Description of the Drawings

The foregoing and other objects of the present invention will become apparent as the following description proceeds and the features of novelty which characterize the invention will be pointed out in particularity in the claims annexed to and forming a part of this specification. For a better understanding of the invention, however, reference is made to the accompanying drawings in which:

Detailed Description

Figure 1:
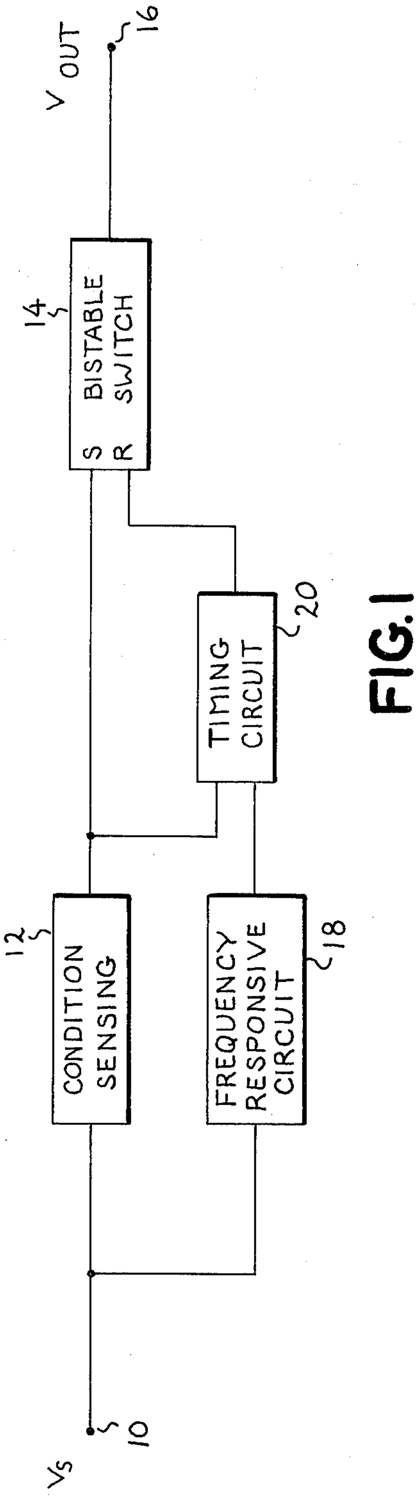
FIG. 1 is a high level block diagram illustrating the principles of the present invention.

Referring now to FIG. 1 which illustrates the present invention in its broad conceptional form, a source signal indicated as $V_s$ is applied to a terminal 10 of the circuitry of the present invention. The origin of the source signal is unimportant to the present invention but may be, for example, the output of electrical power generator, a line voltage, or other, which might exhibit a frequency variation over a time period. The source signal $V_s$ is applied to a condition sensing circuit 12 which senses some condition which occurs periodically in the signal such as zero crossover in the positive going direction. As another example, in the case of a square wave the circuit could recognize the positive going wave front. The output of the condition sensing circuit 12 is applied to a first input terminal (S) of a bistable switch 14 to place that switch into a first of its stable states. The output of the bistable switch 14 is applied to a terminal 16 (designated $V_{out}$) and it is the signal at this terminal which is the pulse of varying width corresponding to the frequency of the signal applied to terminal 10.

The signal at terminal 10 is also applied to a frequency responsive circuit 18. The nature of the circuit 18 does not form a part of the present invention and its depiction in FIG. 1 is representative. As examples, however, the frequency responsive circuit 18 might include frequency discriminators comprised of resonant circuits similar to those used in FM radio or it might include suitable means responsive to a given condition of a voltage source to provide a count with a subsequent digital to analog converter providing an output signal having a magnitude which is the function of the frequency. In the case of an electric power generator, the function of the frequency responsive circuit 18 might be achieved by means of a tachometer connected to the generator and outputting a signal having a magnitude corresponding to the rotational speed and hence the frequency of the generator output. As another example, the frequency responsive circuit could take the form of a monostable multivibrator (one shot) which would recognize a given condition of the source voltage and would output, through a filter or integrator, a voltage which was the function of the input frequency. In this situation the one shot would normally have an unstable state somewhat shorter than the period of the highest frequency of the source voltage. In any case, the frequency responsive circuit 18 represents the derivation of a signal having a recognizable value which is a function of the $V_s$ signal.

The output of the frequency responsive circuit 18 is applied to a timing circuit 20. The timing circuit 20 serves a timing function to provide an output to the second terminal (R) of the bistable switch 14 at a time which is dependent upon the value of the signal from the frequency responsive circuit 18. As illustrated, the output of the condition sensing circuit 12 forms a second input to the timing circuit and serves to initiate the timing function of the circuit 20. When the timing circuit 20 performs its timing function and outputs a signal to the R terminal of the bistable switch 14, that switch will assume its second stable state of operation to change the value of the signal appearing at terminal 16. Thus it is seen that, as shown in FIG. 1, upon the sensing of a particular condition of the source signal ($V_s$) the bistable switch is placed into its first state. At the same time the timing circuit 20 begins a timing function the length of which is a function of the value of the signal from the circuit 18 such that the switching of the bistable switch to its second stable state occurs after a time period which is a function of the frequency of the source signal. Hence the signal at terminal 16 will be a series of pulses each having a width proportional to the period of the source signal $V_s$ at terminal 10.

Figure 2:
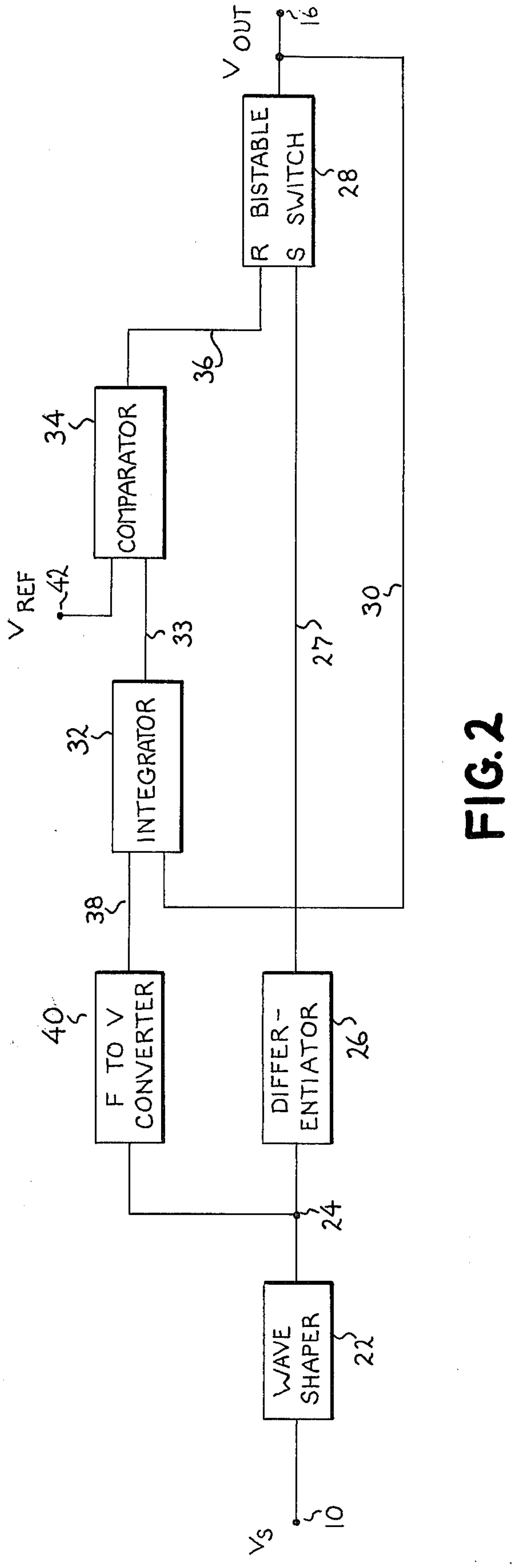
FIG. 2 is an intermediate level block diagram illustrating the present invention in its preferred embodiment.

FIG. 2 shows an intermediate block diagram of the present invention in its preferred embodiment. It is seen that the source signal $V_s$ is again applied to a terminal 10 to which is connected a block 22 designated wave shaper. In the present embodiment, as will be more fully understood as this description proceeds, a differentiator 26 is utilized and it is desirable, therefore, that the signal applied to the differentiator be of a steep wave front or of generally rectangular shape. Wave shaper 22, therefore, represents suitable means, depending upon the nature of the signal $V_s$, to provide a useful wave form. For example, if the signal $V_s$ were a sine wave, wave shaper 22 could comprise a suitable amplifying and clipping network so as to provide a substantially rectangular wave shape at its output terminal 24. In this situation, the rectangular wave at 24 would be the same frequency as the signal $V_s$. Differentiator 26 serves as the condition sensing means by recognizing the positive going wave front of the rectangular wave at terminal 24 to provide an output pulse or a first switching signal from the differentiator 26 to the S input of a bistable switch 28 (corresponding to switch 14 of FIG. 1) placing this switch into its first stable state of operation and to thus provide, for example, a positive voltage at output terminal 16. The output of the bistable switch 28, which occurs substantially simultaneously with the output of differentiator 26, forms one input to an integrator 32 the output of which is applied to a comparator 34. Integrator 32 and comparator 34 collectively perform the function of the timing circuit 20 of FIG. 1. The output of comparator 34 is applied via a line 36 to the second (R) terminal of the bistable switch 28, such that an appearance of the signal on line 36 will cause switch 28 to assume the second of its stable states.

Integrator 32 has a second input by way of a line 38 from a block 40 which is indicated to be a frequency to voltage (F to V) converter which receives its input from junction 24. Converter 40 corresponds to the frequency responsive circuit 18 of FIG. 1 and may be one of those previously discussed. Converter 40 provides, via line 38, a control signal which has a value, in this case a voltage magnitude, which is proportional to the frequency of its input.

Briefly, the operation of the circuitry of FIG. 2 is as follows. A signal $V_s$ is applied to terminal 10 which is properly shaped, if necessary, by shaper 22 to give a rectangular wave shape at junction 24. Differentiator 26 responds to the leading positive going wave front of the signal at 24 to develop a first switching signal on line 27 as an input the the S input of the bistable switch 28 thus placing that switch into the first of its stable states. Concurrently, converter 40 will output a control signal on line 38 to the integrator 32. A second input to the integrator 32 is from the output of the switch 28 and in response to this latter input the integrator 32 will begin to integrate the control signal on line 38 such that its output (line 33) will represent the integration of control signal on line 38. The signal on line 33 is applied to comparator 34 where it is compared with a fixed reference voltage ($V_{ref}$) applied to an input terminal 42. When the value of the signal on line 33 enjoys the proper relationship to the reference voltage at terminal 42, comparator 34 will output a second switching signal via line 36 to the R terminal of the bistable switch causing that switch to assume its second stable state of operation and changing the signal appearing at the output terminal 16. This condition of bistable switch 28 will be applied via line 30 to the integrator 32 resetting that integrator in anticipation of the next cycle. Thus, the signal occurring at the output terminal 16 ($V_{out}$) will be a square wave pulse having a duration or width which is a function of the frequency of the signal applied to the input terminal 10. This is true by virtue of the fact that integrator 32 will integrate to the level established by the reference signal on terminal 42 at a rate dependent upon the value of the control signal on line 38. As such, as frequency of the signal $V_s$ increases the control signal on line 38 will increase thus increasing the rate of integration and resulting in shorter pulses at the output terminal 16.

Figure 3:
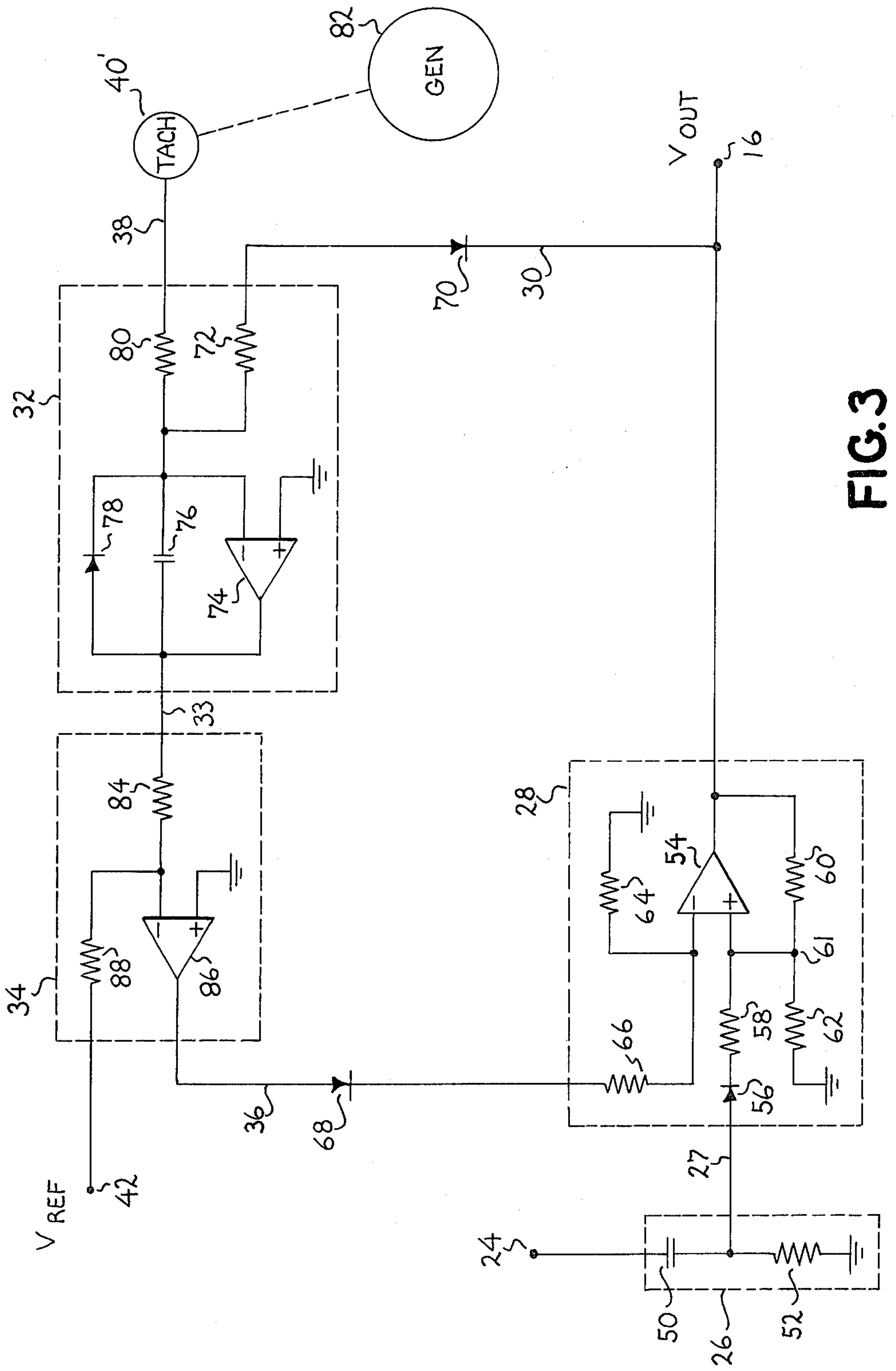
FIG. 3 illustrates in greater detail the circuitry shown in block diagram form in FIG. 2; and, FIG. 4 (*4a –4h*) is waveshapes drawn to the same time base useful in understanding the preferred embodiment of the invention shown in FIG. 3.

FIG. 3 shows in greater detail the preferred embodiment of the invention illustrated in block in FIG. 2. In FIG. 3, insofar as practical, the same reference characters are utilized as were utilized with respect to FIG. 2. The signal at terminal 24 forms an input to the differentiator 26 which in its simplest form may be a series circuit including a capacitor 50 and a resistor 52 connected between the terminal 24 and ground. The output of the differentiator circuit 26 on line 27 is taken from the junction of the capacitor and the resistor.

The differentiator output is applied to the plus terminal of an operational amplifier 54 of the bistable switch 28 by way of a diode 56 and a resistor 58. Diode 56 is poled such that only positive signals appearing on line 27 can be applied to the plus input of the amplifier 54. A feedback resistor 60 is connected between the output and the plus input of the amplifier 54 which input is further connected to ground through a resistor 62. The minus input of amplifier 54 is connected to ground through a resistor 64 and is further connected to the output of the comparator 34 (line 36) through a resistor 66 and a diode 68 poled to conduct only positive signals from comparator 34 to the minus terminal of amplifier 54.

The output of amplifier 54 (output of the bistable switch 28) is connected to the output terminal 16 and is further connected via line 30, a diode 70 having its cathode connected to the output terminal 16 and a resistor 72 to the minus input of an operational amplifier 74 within the integrator 32. Integrator 32 is, in the present embodiment, designed to integrate only to negative values and to this end there is provided a capacitor 76 connected between the output and the minus input of the amplifier 74. In parallel with capacitor 76 is a diode 78 poled to conduct from output to input and thus permit negative integration; i.e. when the amplifier output is more negative than its input. The plus input terminal of the amplifier 74 may be connected to ground. Also forming an input to the minus input of amplifier 74 by way of a resistor 80 is the control signal on line 38. In this instance, the signal on line 38 has been depicted as being derived from a tachometer 40' shown connected by a dotted line to the shaft of a rotating generator 82 such that tachometer 40' provides an analog signal on line 38 having a voltage magnitude proportional to the speed and hence the frequency of the generator 82. (It is, of course, to be realized that other forms of frequency to voltage converters such as those earlier discussed could be used in the present embodiment. In this event, line 38 would be connected by way of such a suitable frequency to voltage converter to the terminal 24.)

The output of the integrator 32 is applied via line 33 and a resistor 84 to the minus input of a third operational amplifier 86 within the comparator 34. This same input terminal has a further signal applied by way of a resistor 88 from the terminal 42 to which is applied a reference voltage ($V_{ref}$) of desired magnitude. The plus input terminal of the amplifier 86 may be connected to ground and the putput of the comparator 34 is applied via line 36 and diode 68 to the bistable switch 28 as previously described.

The operation of the circuitry of FIG. 3 may best be understood when taken in conjunction with the wave forms of FIGS. 4*a* through 4*h*. It will be remembered from the description of FIG. 2 that the signal appearing at terminal 24 was stated to be, preferably, of rectangular shape as shown in FIG. 4*a*. The period "T" of the signal will be the same as that of the source voltage at terminal 10. It is recognized that if a sine wave were present at terminal 10, the rectangular wave shape of FIG. 4*a* would be symmetrical. However, as will be more fully understood as this description proceeds, inasmuch as only the positive going wave front is utilized in the present invention the more general case of the asymmetyrical wave is shown in FIG. 4*a*. Further, by way of explanation, in that the voltages actually utilized in the presently to be described example will depend upon the components used, they will be discussed simply as those which will effect positive and negative saturation ($+E_s$ and $-E_s$) of the several operational amplifiers.

In the quiescent state, that is, at a time prior to $t_0$ in FIG. 4, the circuitry exists as follows. (After a complete cycle of operation has been explained it will become apparent that the circuit always returns to this quiescent state and remains therein until once again triggered.) At this time the voltage appearing at the terminal 24 will be at some negative value (illustrated as $-E_s$) and the voltage on line 38 will be constant at some positive value. The voltage at the minus terminal of the operational amplifier 54 will be at ground or 0 volts to thus reverse bias diode 68. Operational amplifier 54 of the bistable switch 28 will be at negative saturation such that its output voltage is at $-E_s$ and thus junction 61, the junction of the resistors 60 and 62, will be at some negative voltage more positive than the $-E_s$ depending upon the value of those two resistors. For example, if the saturation voltage of amplifier 54 were 11 volts, the voltage appearing at junction 61 could be approximately −3 volts. In that amplifier 54 is in negative saturation, diode 70 will be in the conducting state such that the output voltage of amplifier 74 of integrator 32 tends to be positive causing diode 78 to conduct and hold that voltage at approximately 0 volts. The reference voltage, $V_{ref}$, applied to terminal 42 is a positive value somewhat greater than the normal saturation voltage of amplifier 74 thus placing amplifier 86 into negative saturation.

Triggering of the system occurs when the voltage at terminal 24 steps positive as shown at time $t_0$ in FIG. 4*a*. The differentiator differentiates the signal at terminal 24 so that at time $t_0$ the voltage appearing at the junction of the capacitor and resistor on line 27 will step from 0 to approximately 2 times the saturation voltage (see FIG. 4*b*). Diode 56 will now conduct and raise the voltage at the plus terminal of the amplifier 54 to some positive value (FIG. 4*c*) thus switching amplifier 54 from negative to positive saturation. The output voltage of the switch 28 as shown in FIG. 4*d* is now positive at the output terminal 16. It is possible for the amplifier 54 to stay in this condition indefinitely in that diode 68 is still reversed biased and thus the voltage appearing at the minus input of the amplifier 54 is equal to approximately 0 volts. However, since amplifier 54 is in positive saturation thus placing junction 61 at some positive value, the differential input to the amplifier 54 is positive.

With the positive saturation voltage appearing at the output of the amplifier 54 diode 70 is reversed biased and its anode voltage will approach 0 volts (FIG. 4*f*) permitting operational amplifier 74 to begin its integration of the control signal (here a voltage) on line 38. The output of integrator 32, FIG. 4*g*, will begin to change in the negative direction at a rate which is a function of the value of the voltage on line 38; that is, $$\frac{de_{33}}{dt} = \frac{-E_{38}}{R_{80}C_{76}}$$

wherein:

$e_{33}$ = instantaneous voltage on line 33
$E_{38}$ = voltage on line 38
$R_{80}$ = resistance of resistor 80
$C_{76}$ = capacitance of capacitor 76

As the voltage on line 33 becomes more negative, the voltage at the minus input of amplifier 86 becomes less positive. When this voltage equals approximately 0 volts, (time $t_1$ in FIG. 4) the comparator 34 will switch state (FIG. 4*h*) such that the output of the amplifier 86 goes from negative saturation to positive saturation causing diode 68 to conduct and raising the voltage to the minus input of amplifier 54 to some positive value in excess of that appearing at junction 61. With these inputs amplifier 54 will switch from positive to negative saturation allowing diode 70 to conduct and integrator 32 will then begin an integration back to 0 volts. Since the voltage at the minus input of amplifier 86 follows the output of the amplifier 74, amplifier 86 will switch back to the negative saturation again back biasing diode 68. At time $t_2$ the voltage on line 33 will be equal to 0 volts and diode 78 will again tend to conduct; clamping the voltage on line 33 at 0 volts. The circuit has once again achieved the quiescent state and will remain in that state until such time as the voltage appearing at terminal 24 again steps positive as illustrated at time $t_3$ in FIG. 4. Thus it is seen that the voltage at terminal 16 is positive only while the integrator 32 is integrating or changing its output on line 33 in the negative direction.

Since, as was shown in the previous equation the rate of integration is a function of the value of the signal on line 38 which in turn is a function of the frequency and since the integration is always to a defined value, the width of the output pulse ($t_0$ to $t_1$) is, therefore, inversely proportional to the frequency. In mathematical terms:

$$E_{38} = K \cdot \text{freq.} = K/T$$

wherein $K$ is a constant. Therefore, substituting into the earlier equation and integrating gives, $$\int_0^{LL} de_{33} = \frac{-K}{TR_{80}\,C_{76}} \int_0^{t_1} dt$$

wherein $LL$ is the lower limit of integration gives $$LL = \frac{-K}{TR_{80}\,C_{76}} t_1$$

or $$\frac{t_1}{T} = -\frac{LL\,R_{80}\,C_{76}}{K} =$$

a constant which is the desired result. Since $LL$ has a negative value (in one embodiment $LL = -10$ volts) the ratio $^{t}1/T$ is a positive number.

Figure 4:
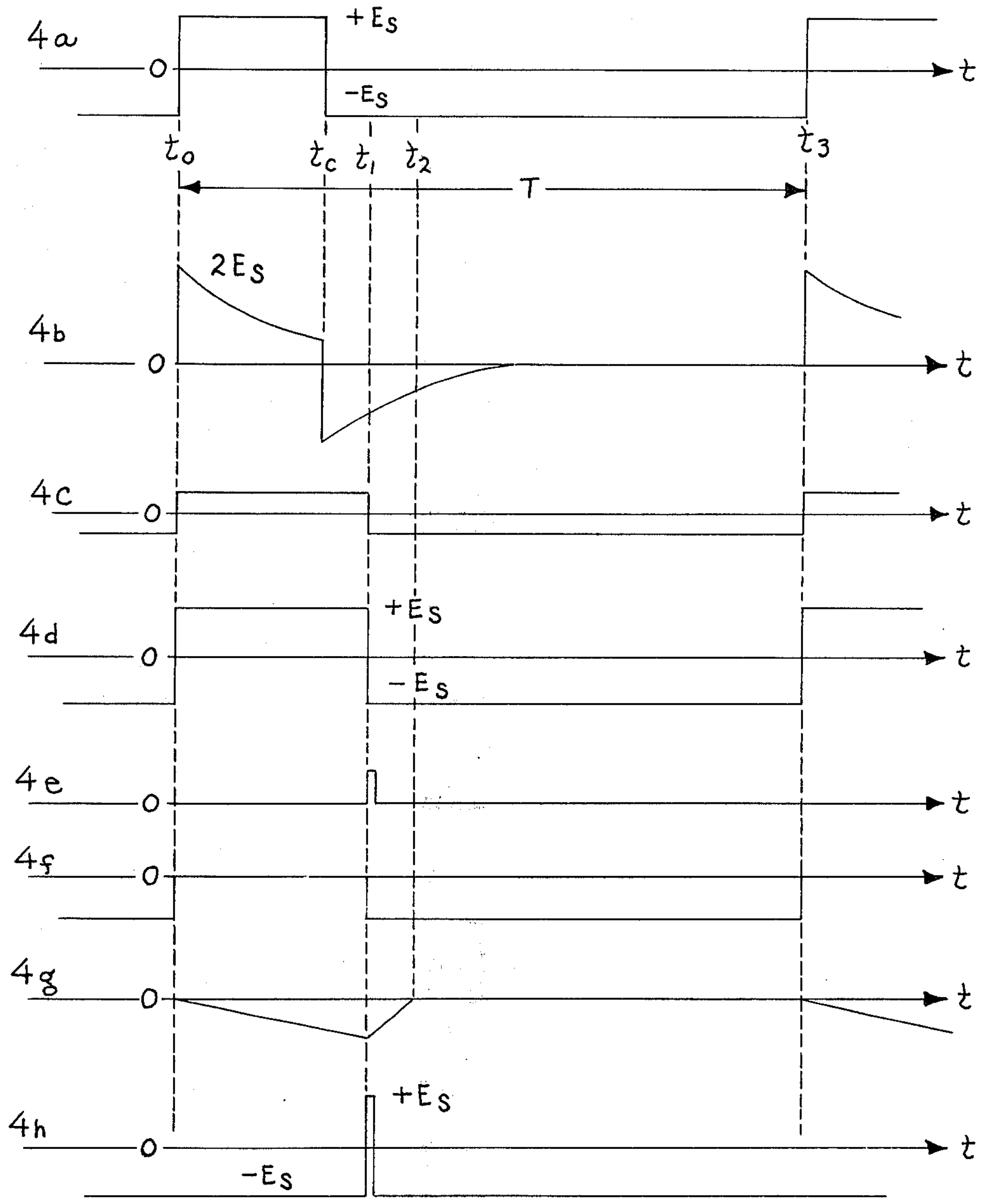

As shown in FIG. 4$a$, the voltage appearing at terminal 24 stepped negative at time $t_c$. This step did not affect the operation of the pulse generator of the present invention because diode 56 became reversed biased and blocked the signal. In fact, diode 56 always blocks the negative going wave front of the voltage applied thereto so that the input voltage can step negative at any time between $t_0$ and $t_3$ without having any effect on the pulse width generator. The time interval $t_0$ to $t_3$, that is the period T of the input wave form, can be any value provided that the time $t_3$ occurs after the time required for the integrator to integrate back to 0 volts; i.e. $t_2$.

From the foregoing description of one cycle of the operation it is seen that the integrator always integrates to a fixed value as determined by the value of the voltage $V_{ref}$ applied to terminal 42. In that the integration rate is a function of the value of the control signal appearing on line 38 which was stated to be proportional to the frequency, the pulse width on terminal 16 ($V_{out}$) will thus always be a fixed percentage of the input signal period T.

It will be immediately obvious that the width of the pulse may be readily varied by changing the value of the resistor 80, of the capacitor 76 or by changing the value of the reference voltage applied to terminal 42. Thus it is seen that there has been provided a pulse generator for providing pulses each having a width corresponding to a prescribed percentage of the period of the variable frequency source signal.

While there has been shown and described what is at present considered to be the preferred embodiment of the invention, modifications thereto will readily occur to those skilled in the art. It is not desired, therefore, that the invention be limited to the specific arrangement shown and described and it is intended to cover, in the appended claims, all such modification as fall within the true spirit and scope of the invention.

What is claimed is:

1. A pulse generating circuit providing pulses each having a width corresponding to a prescribed percentage of the period of a variable frequency source signal comprising:

a. means to provide a pulse initiation signal in response to a prescribed condition of said source signal;

b. means to generate a pulse termination signal after a period of time from the occurrence of said initiation signal including means responsive to the frequency of said source signal to determine said period of time; and c. means responsive to said initiation signal and said termination signal to provide an output pulse having a duration corresponding to said time period.

2. A pulse generating circuit for providing pulses having a width which is a given percentage of the period of a variable frequency source signal comprising:

a. means to provide a control signal having a value proportional to the frequency of said source signal;

b. means to provide a first switching signal in response to a predetermined condition of said source signal;

c. means responsive to said control signal to provide a second switching signal after a period of time, said period of time being a function of the value of said control signal; and, d. a bistable switch responsive to said first and second switching signals to assume, respectively, first and second states of operation and to provide an output signal indicative of said states of operation, the time period during which the output signal corresponds to said first state of operation being a pulse which has a width as a given percentage of the period of the source signal.

3. The invention in accordance with claim 2 when said control signal is a voltage signal having a magnitude proportional to the frequency of said source signal.

4. The invention in accordance with claim 3 wherein the means responsive to the control signal includes an integrating circuit for providing an output in response to said control signal and a comparison circuit for comparing the output of said integrating circuit with a reference signal to provide said second switching signal.

5. The invention in accordance with claim 4 wherein each of said integrating and comparison circuits employs an operational amplifier.

6. The invention in accordance with claim 3 wherein the operation of the integrated circuit is initiated in response to said switch assuming said first state.

7. The invention in accordance with claim 4 wherein the integrating circuit includes means to inhibit integration in excess of a prescribed value.

* * * * *